United States Patent Office 3,751,379
Patented Aug. 7, 1973

3,751,379
REGENERATION OF A COKE-DEACTIVATED
BIMETALLIC CATALYST
John C. Hayes, Palatine, Ill., assignor to Universal Oil
Products Company, Des Plaines, Ill.
No Drawing. Filed Apr. 12, 1971, Ser. No. 133,403
Int. Cl. B01j 11/18; C10g 35/06
U.S. Cl. 252—415                                           30 Claims

ABSTRACT OF THE DISCLOSURE

A deactivated hydrocarbon conversion catalyst, which is a combination of a platinum group component, a group IV–A metallic component, and a halogen component with a porous carrier material and which has been deactivated by deposition of carbonaceous materials thereon during a previously contacting with a hydrocarbon charge stock at an elevated temperature, is regenerated by the sequential steps of: (1) burning carbon therefrom at a relatively low temperature with a gas stream containing halogen or a halogen-containing compound, $H_2O$, and a relatively small amount of $O_2$, (2) treating the resulting partially regenerated catalyst at a relatively higher temperature with a gas stream containing a halogen or a halogen-containing compound, $H_2O$, and a relatively higher amount of $O_2$, (3) purging $O_2$ and $H_2O$ from contact with the resulting catalyst, and (4) subjecting the resulting catalyst to contact with a substantially sulfur-free hydrogen stream at reduction conditions. Key features of the disclosed method are: (1) presence of water and halogen in the gas stream used in the carbon-burning step and in the oxygen-treating step, (2) careful control of the temperature during each step, (3) maintenance of the halogen content of the catalyst at a relatively high level during the entire regeneration procedure, and (4) careful control over the composition of the gas streams used in the various steps thereof.

DISCLOSURE

The subject of the present invention is a method for regenerating a coke-deactivated hydrocarbon conversion catalyst comprising a platinum group component, a group IV–A metallic component, and a halogen component combined with a porous carrier material. More specifically, the present invention is a method for regenerating a deactivated hydrocarbon conversion catalyst comprising a combination of a platinum, component, a group IV–A metallic component and a halogen component with an alumina carrier material where the catalyst has been deactivated by the deposition of carbonaceous materials thereon during a previous contacting with a hydrocarbon charge stock at an elevated temperature. In essence, the present invention provides a specific sequence of carbon-burning and catalyst treatment steps designed to result in a regenerated catalyst possessing activity, selectivity, and stability characteristics which are comparable to those observed with the fresh undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is throught to be associated with an acid-acting material of the porous, adsorptive, refractory oxide type which is typically utilized as the support or carrier for a heavy metal component such as one or more of the metals or compounds of metals of group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes, is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example, is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of the desired product and/or products obtained as a function of the amount of the reactants converted or charged; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield that is obtained relative to the amount of charge at the particular severity level; and stability is typically equated to the rate of change with time of activity, as measured by octane number of $C_5+$ product, and of selectivity, as measured $C_5+$ yield. Actually, the last statement is not strictly correct because generally a continuous reforming process is run to produce a constant octane $C_5+$ product with the severity level being continuously adjusted to attain this result; and, furthermore, the severity level is for this process usually varied by adjusting the conversion temperature, in the reaction zone so that, in point of fact, the rate of change of activity finds response in the rate of change of conversion temperature, and changes in this last parameter are customarily taken as indicative of activity stability.

As is well known to those skilled in the art, the principal cause of observed deactivation or instability of these dual-function catalysts when they are used in a hydrocarbon conversion reaction is associated with the formation of coke or carbonaceous materials on the surface of the catalyst during the course of the reaction.

More specifically, the conditions utilized in these hydrocarbon conversion processes typically result in the formation of heavy, black, solid or semi-solid carbonaceous material which deposit on the surface of the catalyst and gradually reduce its activity by shielding its active sites from the reactants. Recently, there has been developed a new type of dual-function catalytic composite which possesses significantly improved activity, selectivity, and stability characteristics when it is employed in a process for the conversion of hydrocarbons of the kind which has heretofore utilized dual-function catalytic composites such as processes for isomerization, dehydrogenation, hydrogenation, alkylation, transalkylation, dealkylation, cyclization, dehydrocyclization, cracking, hydrocracking, reforming, desulfurization, and the like processes. In particular, it has been determined that use of a bimetallic catalyst comprising a combination of a platinum group component, a group IV–A metallic component, and a halogen component with a porous carrier material can enable the performance of hydrocarbon conversion processes which have traditionally utilized dual-function, platinum-containing catalysts to be substantially improved. For example, it has been demonstrated that the overall performance characteristics of a reforming process can be sharply improved by the use of these group IV–A metal-containing bimetallic catalysts. Not unexpectedly, the deactivation of these bimetallic catalysts occurs in much the same manner as for any other hydrocarbon conversion catalyst having a platinum metal component when it is employed in the hydrocarbon conversion service. Accordingly, the principal mode of deactivation of these bimetallic catalysts is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating these recently developed group IV–A metal-containing bimetallic catalysts. More specifically, it has been established that the application of conventional regeneration techniques which have long been practiced in the art of regenerating dual-function hydrocarbon conversion catalysts, has not been successful in restoring the initial activity, selectivity, and stability characteristics of this type of bimetallic catalyst. Typically, the application of conventional carbon-burning procedures with oxygen-containing gases results in a regenerated catalyst having an extremely low activity and containing a reduced amount of halogen component. Attempts at restoring the initial level of halogen contained in the catalyst by well known halogen adjustment procedures on the regenerated catalyst have not been successful.

The problem addressed by the present invention is accordingly, the regeneration of a deactivated hydrocarbon conversion catalyst comprising a combination of a platinum group component, a group IV–A metallic component, and a halogen component with a porous carrier material when the catalyst contains deactivating amounts of carbonaceous materials.

The conception of the present invention was facilitated by my recognition that the adverse effects that have heretofore been commonly encountered in attempts to regenerate bimetallic catalysts of this type by conventional oxygen-burning techniques were caused by a failure to appreciate the acute sensitiveness of this kind of catalyst to loss of combined halogen during the regeneration procedure and the attendant difficulty of restoring a uniform distribution of the halogen component in the catalyst once a substantial amount of halogen is removed from the catalyst. More specifically, I have ascertained that the presence of the proper amount of halogen component in this type of bimetallic catalyst is an essential condition for its possession of superior catalytic properties, and that it is an extremely difficult task to restore a uniform distribution of this halogen component in the catalyst once it has been removed during a conventional regeneration procedure by the stripping effect of the regenerating gases. Recognizing this sensitivity of the catalyst to loss of halogen, the present invention is directed at a method of regeneration which maintains a uniform distribution of a high level of halogen on the catalyst throughout the regeneration procedure. More specifically, I have now found a specific sequence of interrelated steps which enable the successful regeneration of this recently developed, high-performance, bimetallic hydrocarbon conversion catalyst, and essential features of my method are: careful control of the temperature throughout the regeneration procedure, presence of water and halogen or a halogen-containing compound in the gas streams used during the carbon-burning step and oxygen-treating steps, maintenance of halogen content of the catalyst at a high level during the entire regeneration procedure, and careful control of the composition of the gas streams used in all steps to insure the absence of detrimental constituents.

It is, therefore, a principal object of the present invention to provide an improved method for regenerating a bimetallic hydrocarbon conversion catalyst comprising a combination of a platinum component, a group IV–A metallic component, and a halogen component with a porous carrier material when the catalyst has been deactivated by contact with a hydrocarbon charge stock at elevated temperatures. A corollary object is to provide a solution to the problem of regenerating these recently-developed, high-performance bimetallic catalysts which solution enables the substantial restoration of the activity, selectivity, and stability characteristics of the original catalyst. An overall object is to extend the total catalyst life of these group IV–A metal-containing bimetallic catalysts and to obtain more efficient and effective use of these catalysts during their active life. Another object is to provide a regeneration method which maintains the halogen content of this type of catalyst at a high level throughout the regeneration procedure.

In brief summary, the present invention is, in one broad embodiment, a method for regenerating a deactivated hydrocarbon conversion catalyst, comprising a combination of a platinum group component, a group IV–A metallic component, and a halogen component with a porous carrier material, where the catalyst has been deactivated by deposition of carbonaceous materials thereon during a previous contacting with a hydrocarbon charge stock at an elevated temperature. The first step of the method is the carbon-burning step and it comprises contacting the deactivated catalyst with a gaseous mixture consisting essentially of about 0.2 to about 3 mole percent $O_2$, about 0.02 to about 25 mole percent $H_2O$, about 0.0005 to about 5 mole percent of a halogen or a halogen-containing compound and an inert gas at a temperature of about 350 to about 500° C. for a first period sufficient to substantially remove said carbonaceous materials. Following this first step, the catalyst resulting therefrom is subjected to an oxygen-treating step by contacting it with a gaseous mixture consisting essentially of about 0.2 to about 25 mole percent $O_2$, about 0.02 to about 25 mole percent $H_2O$, about 0.0005 to about 5 mole percent of a halogen or halogen-containing compound and an inert gas for a second period of at least about 1 to 5 hours at a temperature of about 400 to about 550° C. Thereafter, oxygen and water are purged from contact with the resulting catalyst by means of an inert gas stream. In the final step, the resulting catalyst is subjected to contact with a substantially sulfur-free hydrogen stream at a temperature of about 370 to 600° C. for a final period of at least about 0.5 to about 5 hours, thereby producing a regenerated hydrocarbon conversion catalyst having activity, selectivity, and stability characteristics comparable to those possessed initially by the fresh catalyst.

In brief summary, a preferred embodiment of the present invention is a method for regenerating a deactivated hydrocarbon conversion catalyst comprising a combination of a platinum component, a group IV–A metallic component and a chlorine component with an alumina carrier material, where the catalyst has been deactivated by deposition of carbonaceous materials thereon during a previous contacting with a hydrocarbon charge stock at an elevated temperature. The first step of this preferred embodiment is the carbon-burning step and it involves contacting the deactivated catalyst with a gaseous mixture consisting essentially of about 0.2 to about 3 mole percent $O_2$ about 0.002 to about 25 mole percent $H_2O$, about 0.0005 to about 5 mole percent of chlorine or a chlorine-containing compound and an inert gas at a temperature of about 350 to about 500° C. for a first period sufficient to substantially remove said carbonaceous materials while at least maintaining the chlorine content of the catalyst at its initial level. Following this step, the catalyst resulting therefrom is subjected to contact with a gaseous mixture consisting essentially from about 0.2 to about 3 mole percent $O_2$, about 0.02 to about 25 mole percent $H_2O$, about 0.0005 to about 5 mole percent of chlorine or chlorine-containing compound and an inert gas for a second period of at least about 0.5 to about 5 hours at a temperature of about 500 to about 550° C. In the third step, the catalyst is subjected to contact with another gaseous mixture consisting essentially of about 0.2 to about 25 mole percent $O_2$, about 0.02 to about 25% $H_2O$, and about 0.0005 to about 5 mole percent of chlorine or a chlorine-containing compound and an inert gas for a third period of at least about 1 to 5 hours at a temperature of about 500 to about 550° C. Thereafter, oxygen and water are purged from contact with the catalyst with an inert gas stream. In the final step the catalyst is subjected to contact with a substantially sulfur-free hydrogen stream at a temperature of about 370 to about 600° C. for a final period of at least about 0.5 to about 5 hours to produce a regenerated hydrocarbon conversion catalyst having activity, selectivity, and stability characteristics comparable to those possessed intially by the fresh catalyst.

In a more specific preferred embodiment, the present invention is a regeneration procedure, as summarized in the preferred embodiment above wherein the catalyst resulting from the third step is treated with a gaseous mixture comprising about 1 to about 30 mole percent $H_2O$, about 0.01 to about 1.5 mole percent of chlorine or chlorine-containing compound and air for a fourth period of at least about 3 to 5 hours at a temperature of about 500 to 550° C. Thereafter, in this embodiment the oxygen and water are purged from contact with this catalyst, and the purged catalyst subjected to contact with a substantially sulfur-free hydrogen stream as described above in the preferred embodiment.

Other objects and embodiments of the present invention encompass further details about the deactivated catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention involves a regeneration procedure which is applicable to a bimetallic catalyst comprising a platinum group component, a group IV–A metallic component and a halogen component combined with a porous carrier material. Considering first the porous carrier material utilized in the type of catalysts regenerated by the present invention, the carrier material is typically a porous, adsorptive, high-surface area support having a surface area of about 25 to about 500 m.$^2$/g. The porous carrier material should be relatively refractory to the conditions utilized in the hydrocarbon conversion process; examples of acceptable carriers are: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of one or more elements from these groups. The preferred porous carrier materials are refractory inorganic oxides, with best results usually obtained with an alumina carrier material. Suitable alumina materials are the crystalline aluminas known as the gamma-, eta-, and these-aluminas, with gamma-alumina giving best results. In addition, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g./cc. and surface area characteristics such that the average pore diameter is about 20 to 300 angstroms, the pore volume is about 0.1 to about 1 ml./g. and the surface area is about 100 to about 500 m.$^2$/g. In general, excellent results are typically obtained with a gamma-alumina carrier material which is used in the form of spherical particles having: a relatively small diameter (i.e., typically about 1/16 inch), an apparent bulk density of about 0.5 gm./cc., a pore volume of about 0.4 ml./gm., and a surface area of about 175 m.$^2$/gm.

One essential constituent of the type of catalyst regenerated by the present method is the group IV–A metallic component. By the use of the generic term "group IV–A metallic component" it is intended to cover the metals and compounds of the metals of group IV–A of the Periodic Table. More specifically, it is intended to cover: germanium and the compounds of germanium; tin and the compounds of tin; lead and the compounds of lead; and mixtures of these metals and/or compounds of metals. This group IV–A metallic component may be present in the catalytic composite as an elemental metal, or in chemical combination with one or more of the other ingredients of the composite, or as a chemical compound of the group IV–A metal such as the oxide, sulfide, halide, oxyhalide, oxychloride, aluminate, and the like compounds. Based on the evidence currently available, it is believed that best results are obtained when the group IV–A metallic component exists in the final composite in an oxidation state above that of the elemental metal. Regardless of the state in which this component exists in the composite, it can be utilized therein in any amount which is catalytically effective with the preferred amount being about 0.01 to about 5 wt. percent thereof, calculated on a carbonaceous material-free and elemental basis. The exact amount selected within this broad range is preferably determined as a function of the particular group IV–A species that is utilized. For instance, in the case where this component is lead, it is preferred to select the amount of this component from the low end of this range—namely, about 0.01 to about 1 wt. percent. In the case where this component is tin, it is preferred to select from a relatively broader range of about 0.05 to about 2 wt. percent thereof. And, in the preferred case, where this component is germanium, the selection can be made from the full breadth of the stated range—specifically, about 0.1 to about 5 wt. percent with best results at about 0.05 to about 2 wt. percent. This group IV–A component may be incorporated in the composite in any suitable manner known to the art such as by coprecipitation or cogellation with the porous carrier material, ion exchange with the carrier material, or impregnation of the carrier material at any stage in its preparation. However, best results are believed to be obtained when the group IV–A component is uniformly distributed throughout the porous carrier material. One acceptable method of incorporating the group IV–A component into the catalytic composite involves cogelling the group IV–A component during the preparation of the preferred carrier material, alumina. This method typically involves the addition of a suitable soluble compound of the group IV–A metal of interest to the alumina hydrosol. The resulting mixture is then commingled with a suitable gelling agent such as a relatively weak alkaline reagent, and the resulting mixture is thereafter preferably gelled by dropping into a hot oil bath. After aging, drying and calcining the resulting particles there is obtained an intimate combination of the oxide of the group IV–A metal and alumina. One preferred method of incorporating this component into the composite involves utilization of a soluble, decomposable compound of the particular group IV–A metal of interest to impregnate the porous carrier material either before, during or after the carrier material is calcined. In general, the solvent used during this impregnation step is selected on the basis of its capability to dissolve the desired group IV–A compound without affecting the porous carrier material which is to be impregnated; ordinarily, good results are obtained when water is the solvent; thus the preferred group IV–A compounds for use in this impregnation step are typically water-soluble and decomposable. Examples of suitable group IV–A compounds are: germanium difluoride, germanium tetrafluoride, germanium dioxide, germanium monosulfide, tin bromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrile, lead dithionate, and the like compounds. In the case where the group IV–A component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized the group IV–A component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the group IV–A component is germanium or a compound of germanium.

A second essential ingredient of the type of catalyst which can be regenerated by the present method is the platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on a carbonaceous material-free and elemental basis. Excellent results are obtained when the catalyst contains about 0.05 to about 1 wt. percent of the platinum group metal. The preferred platinum group component is platinum or a compound of platinum although good results are obtained when it is palladium or a compound of palladium. The platinum group may be incorporated in the catalytic composite in any suitable manner such as coprecipitation or cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metal may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. Hydrogen chloride or the like acid is also generally added to the impregnation solution in order to further facilitate the incorporation of the halogen component and the distribution of the metallic component.

Another essential ingredient of the type of catalysts regenerated by the present method is a halogen component. Although the precise form of the chemistry of the association of the halogen component with the carrier material is not entirely known, it is customary in the art to refer to the halogen component as being combined with the carrier material, or with the other ingredients of the catalyst. This combined halogen may be either fluorine, chlorine, iodine, bromine, or mixtures thereof. Of these, fluorine and particularly chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of a suitable water-soluble, decomposable halogen-containing compound such as hydrogen fluoride, hydrogen chloride, hydrogen bromide, etc. The hydrogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. percent and preferably about 0.5 to about 1.5 wt. percent of halogen calculated on a carbonaceous material-free and elemental basis. In isomerization or hydrocracking embodiments, it is generally preferred to utilize relatively large amounts of halogen in the catalyst—typically ranging up to about 10 wt. percent halogen calculated on the same basis, and more preferably about 1 to about 5 wt. percent.

After impregnation of the catalytic components into the porous carrier material, the resulting composite is, in the preferred method of preparing this type of catalyst, typically subjected to a conventional drying step at a temperature of about 200° F. to about 600° F. for a period of about 1 to 24 hours. Thereafter, the dried composite is typically calcined at a temperature of about 700° F. to about 1100° F. in an air stream for a period of about 0.5 to 10 hours. Moreover, conventional pre-reduction and presulfiding treatments are typically performed in the preparation of catalytic composites which are regenerated by the method of the present invention. In fact, it is preferred to incorporate about 0.01 to about 0.5 wt. percent of sulfur component into the subject catalyst by a conventional presulfiding step.

In a preferred embodiment, the catalyst regenerated by the present invention is a combination of a platinum component, a chlorine component, and a Group IV–A metallic component with an alumina carrier material. These components are preferably present in amounts sufficient to result in the catalyst containing, on a carbonaceous material-free and elemental basis, about 0.5 to 1.5 wt. percent chlorine, about 0.05 to about 1 wt. percent platinum, and about 0.01 to about 5 wt. percent Group IV–A metal.

As indicated hereinbefore, the principal utility for this type of bimetallic catalyst is in a hydrocarbon conversion process wherein a dual-function hydrocarbon conversion catalyst having a hydrogenation-dehydrogenation function and an acid-acting function has been traditionally used; for example, these catalysts are used in a reforming process, with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50 to about 150° F., and an end boiling point within the range of about 325 to 425° F., or it may be a selective fraction thereof which generally will be a higher boiling fraction commonly referred to as a heavy naptha—for example, a naphtha boiling in the range of $C_7$ to 400° F. provides an excellent charge stock. In general, the conditions used in the reforming process are: a pressure of about 0 to about 1000 p.s.i.g. with the preferred pressure being 100 to about 600 p.s.i.g., a temperature of about 800 to about 1100° F and preferably about 900 to about 1050° F., a hydrogen to hydrocarbon mole ratio of about 1 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

In harmony with my findings on the criticalness of the halogen component to the performance of this catalyst, it is preferred to operate the hydrocarbon conversion process using this catalyst with injection of a halogen or halogen-containing compound into the feed stream thereto in order to maintain the halogen component of the catalyst at a relatively high level. In particular, it is preferred to add about 1 to about 20 wt. p.p.m., based on the charge stock, of chlorine or chlorine-containing compounds such as the alkyl chlorides to the charge stock to the process either on a continuous or intermittent basis The exact amount of halogen added to the process in this fashion is usually determined as a function of the amount of water which is continuously entering the conversion zone and numerous techniques are available for developing the proper correlation between water level entering the conversion zone and the precise amount of halogen which must be added to the feed stream in order to maintain the halogen component of the catalyst at the desired level. For a given charge stock and process these correlations are easily developed by experimental methods well known to those skilled in the art. Regardless of how the halogen component of the catalyst is maintained, it is preferred that it be at a relatively high level before the regeneration procedure described herein is commenced. Specifically, the deactivated hydrocarbon conversion catalyst which is subjected to the method of the present invention should contain at least about 0.1 to about 3.5 wt. percent of the halogen component, calculated on a carbonaceous material-free and an elemental basis, and, more particularly, about 0.5 to about 1.5 weight percent.

When the catalysts of the type described above are employed in the conversion of hydrocarbons, particularly the reforming process outlined above, the activity selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about 0.5 to about 15 wt. percent or more of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped and the conversion zone purged with a suitable gas stream. Thereafter, the regeneration method of the present invention is performed either in situ or the catalyst may be unloaded from the conversion zone and regenerated in an off-line facility.

An essential feature of the present regeneration procedure is the presence of halogen or a halogen-containing compound in the gaseous mixtures used during the carbon-burning step and the oxygen-treating steps. Although a halogen gas such as chlorine or bromine may be used for this purpose, it is generally more convenient to employ a halogen-containing compound such as an alkylhalide, which upon exposure to the conditions utilized in these steps is decomposed to form the corresponding hydrogen halide. In addition, the hydrogen halide may be used directly; in fact best results are achieved when a hydrogen halide is used directly in the gaseous mixtures. In general, chlorine or chlorine-containing compounds are the preferred additives for use in the present invention, with the other halogens typically giving less satisfactory results. The preferred mode of operation involves the use of hydrogen chloride in the gas mixtures used in these steps regardless of the halogen component of the catalyst. In fact, an especially preferred procedure involves the injection of an aqueous solution of hydrogen chloride into the gaseous mixture used in carbon-burning and oxygen-treating steps. The mole ratio of $H_2O$ to HCl used in the gaseous mixtures employed in these steps in the preferred procedure will range from about 20:1 to about 100:1, with a mole ratio of about 50:1 to 60:1 giving the best results. Operation of the regeneration method in this fashion insures that the halogen component of the catalyst is maintained at about 0.5 to about 1.5 wt. percent of the catalyst throughout the regeneration procedure.

It is to be recognized that another essential feature of the subject regeneration method is that the composition of the gas streams used in the various steps thereof are carefully controlled, and the positive requirements for the composition of each of these gas streams are given hereinafter in a manner which excludes the presence of other materials. In particular, it is a critical feature of the present invention that the gas streams used during the carbon-burning step, the oxygen-treating steps, and the optional halogen-adjustment step are substantially free of compounds of sulfur—particularly, oxides of sulfur and $H_2S$—and of carbon monoxide. Likewise, it is essential that the hydrogen stream used during the reduction step be substantially free of sulfur compounds such as $H_2S$. It is, therefore, evident that the gas streams used in each of the steps of the present invention may be once-through streams or recycle streams; provided that in this latter case, the recycle streams are carefully controlled to insure that the positive limitations given hereinafter on the contents of the various gas streams are satisfied, and are treated by conventional techniques to insure the absence of detrimental constituents therefrom. Furthermore, it is to be noted that the temperatures given hereinafter for each of the steps refer to the temperature of the gas stream used therein just before it contacts the catalyst.

According to the present invention, the first essential step of the regeneration procedure is the carbon-burning step and it involves contacting the deactivated catalyst with a gaseous mixture consisting essentially of about 0.2 to about 3 mole percent $O_2$, about 0.02 to about 25 mole percent $H_2O$, about 0.0005 to about 5 mole percent of a halogen or a halogen-containing compound and an inert gas such as nitrogen, helium, carbon dioxide, etc., or mixtures of these. In a preferred mode of operation, the gaseous mixture used in this step contains about 0.5 to about 2 mole percent $O_2$, about 0.1 to about 5 mole percent $H_2O$ about 0.001 to about 0.25 mole percent halogen or halogen-containing compound and an inert gas. The conditions utilized in this step are: a temperature of about 350 to about 500° C., with best results obtained at a temperature of about 375 to about 500° C., a pressure sufficient to maintain the flow of the first gaseous mixture through the zone containing the deactivated catalyst, such as a pressure of about 1 to about 25 atmospheres and preferably about 1 to about 7 atmospheres, and a gas hourly space velocity (defined as the volume rate of the flow of the gas stream per hour at standard conditions divided by the volume of the bed of catalyst particles) of about 100 to about 25,000 hr.$^{-1}$, with a preferred value of about 100 to about 2,000 hr.$^{-1}$. This first step is performed for a first period sufficient to substantially remove carbonaceous materials from the catalyst. In general, depending obviously upon the amount of carbonaceous material present on the catalyst, a first period of about 5 to about 30 or more hours is adequate in most cases, with best results usually obtained in about 20 to 30 or more hours. Ordinarily, this step is terminated when the differential temperature across the zone containing the catalyst is less than one for a period of about 0.5 to 5 hours.

The second essential step of the present regeneration methods is the primary oxygen-treating step and involves subjecting the catalyst resulting from the carbon-burning step, or the optional preliminary oxygen treatment step (explained hereinafter), to contact with a gaseous mixture consisting essentially of about 0.2 to about 25 mole percent $O_2$, about 0.02 to about 25 mole percent $H_2O$, about 0.0005 to about 5 mole percent of a halogen or a halogen-containing compound and an inert gas which is typically nitrogen. The temperature utilized in this step is preferably relatively higher compared to that used in the carbon-burning step, and is selected from the range of about 400 to about 550° C., with best results obtained at higher temperatures of about 500 to about 550° C. The other conditions utilized in this step are preferably the same as used in the carbon-burning step. The duration of this step is at least about 1 to about 5 hours, with excellent results usually obtained in about 1 to about 2 hours. In a preferred mode of operation, the gaseous mixture used in this step contains a relatively higher amount of oxygen than in the carbon-burning step: more specifically it consists essentially of about 4 to about 25 mole percent $O_2$, about 0.1 to about 5 mole percent $H_2O$, about 0.001 to about 0.25 mole percent halogen or a halogen-containing compound and an inert gas. In fact, an especially preferred embodiment of this step involves the use of a temperature of about 500 to about 510° C. and a pressure of about 1 to about 7 atm. for a contact time of about 1 to about 2 hours. The function of this oxygen-treating step is to remove trace amounts of carbonaceous materials which were not burned off during the first step and to insure that the metallic components of the catalyst are oxidized to a positive oxidation state; that is to platinum oxide and group IV–A metal oxide.

Although it is not essential, it is preferred to subject the catalyst resulting from the carbon-burning step to a preliminary oxygen treatment step prior to the essential primary oxygen-treating step described above. This preliminary oxygen-treating step essentially involves subjecting the catalyst resulting from the carbon-burning step to a relatively high temperature (i.e., relative to the temperature used in the carbon-burning step) with a relatively small amount of oxygen in order to burn off any remaining carbon on the catalyst and eliminate any possibility of an uncontrollable, catalyst-damaging exothermic reaction during the primary oxygen-treating step. This step essentially involves contacting the catalyst from the carbon-burning step with a gaseous mixture consisting essentially of about 0.2 to about 3 mole percent $O_2$, about 0.02 to about 25 mole percent $H_2O$, about 0.0005 to about 5 mole percent of a halogen or a halogen-containing compound and an inert gas, which is typically nitrogen. In general, the preferred mode for changing from the carbon-burning step to the primary oxygen-treating step involves a gradual increase in the temperature of the gaseous mixture being charged to the zone containing the catalyst, although in some cases with experience this transition can be a relatively abrupt one. The purpose of this gradual transition is to prevent the development of a substantial temperature rise in the catalyst bed due to incomplete removal of carbonaceous material during the carbon-burning step. This optional step is generally conducted for a period of at least about 0.5 to 5 hours at a temperature of about 500 to about 550° C. Once again, the other conditions utilized are preferably identical to those given above in the discussion of the carbon-burning step. Excellent results are obtained in this step when a gaseous mixture, containing about 0.2 to 3 mole percent $O_2$, about 0.1 to about 5 mole percent $H_2O$ and about 0.001 to about 0.25 mole percent halogen or halogen-containing compound, is used for about 1 to 3 hours at a temperature of about 500 to 510° C. and at a pressure of about 1 to about 7 atm. The function of this preliminary oxygen treatment step is essentially to prepare the partially regenerated catalyst for the more severe oxidation conditions which are typically utilized in the primary oxygen-treating step.

Following the primary oxygen-treating step, it is generally preferred, but not essential, to subject the catalyst resulting therefrom to contact with a gaseous mixture comprising about 1 to about 30 mole percent $H_2O$ and about 0.001 to about 1.5 mole percent of a halogen or a halogen containing compound and air or an inert gas such as nitrogen. An especially preferred mode of operation for this step involves the injection of an aqueous solution of hydrogen chloride into the air stream used in an amount sufficient to result in a gaseous mixture comprising about 1 to 30 mole percent $H_2O$, about 0.001 to about 1.5 mole percent HCl and air. This optional halogen-adjustment step is preferably conducted at a temperature of about 400 to about 550° C. for a period of about 1 to about 10 hours, with excellent results obtained in a period of about 3 to 5 hours at a temperature of about 525° C. The purpose of this step is to adjust the halogen content of the catalyst to an equilibrium value of about 0.1 to about 3.5 wt. percent of the catalyst and preferably about 0.5 to about 1.5 wt. percent of the regenerated catalyst, calculated on an elemental basis.

Regardless of whether one or more of these optional steps are performed on the catalyst, the resulting catalyst is thereafter purged with nitrogen or another inert gas to displace oxygen and water therefrom for a period of time which can be easily determined by monitoring the effluent gases from the zone containing the catalysts to determine when they are substantially free of oxygen. This step is preferably performed at a relatively high temperature; for example, 500 to 600° C.

After this purge step, the final essential step of the present invention is commenced. It involves contacting the resulting catalyst with a substantially sulfur-free hydrogen stream at a temperature of about 370 to about 600° C. for a final period of at least about 0.5 to about 5 hours. The preferred conditions for this step are a temperature of 450 to 600° C. for a period of at least about 0.5 to 2 hours. Once again, the pressure and gaseous rates utilized for this step are preferably identical to those reported in conjunction with the discussion of the carbon-burning step. A preferred mode of operation of this step involves the use of a hydrogen stream which is substantially free of water when it initially contacts the catalyst. In the case where it is desired to perform this step in an environment containing free water or with a hydrogen stream containing minor amounts of water, best results are achieved when the hydrogen stream is substantially pure (i.e., contains 99% or more hydrogen). The purpose of this reduction step is to reduce the metallic components essentially to an elemental state and to produce a regenerated catalyst having activity, selectivity, and stability characteristics comparable to those possessed initially by the fresh catalyst.

In many cases, it is advantageous to subject the regenerated catalyst obtained from the reduction step to an additional sulfiding treatment before it is returned to hydrocarbon conversion service. Although any method known to the art for sulfiding a catalyst can be utilized, the preferred procedure involves contacting a suitable sulfide-producing compound with the reduced catalyst at a temperature of about 20 to 550° C. for a period sufficient to incorporate about 0.01 to about 0.5 wt. percent sulfur. The sulfide-producing compound utilized may be selected from the volatile sulfides, the mercaptans, the disulfides and the like compounds; however, best results are ordinarily obtained with hydrogen sulfide. The hydrogen sulfide may be utilized by itself or in admixture with a suitable carrier gas such as hydrogen, nitrogen or the like. Good results have been obtained at a temperature of 375° C. and a pressure of 100 p.s.i.g. with a mixture of $H_2$ and $H_2S$.

Following this reduction step, or the optional sulfiding step, the hydrocarbon conversion process in which the catalyst is utilized may be restarted by once again charging the hydrocarbon stream in the presence of hydrogen to the zone containing the catalyst at conditions designed to produce the desired product. In the preferred case, this involves re-establishing reforming conditions within the zone containing the catalyst.

It is intended to cover by the following claims all changes and modifications of the above disclosure of the present invention that would be self-evident to a man of ordinary skill in the catalyst regeneration art.

I claim as my invention:

1. A method for regenerating a deactivated hydrocarbon conversion catalyst comprising a combination of a platinum group component, a Group IV-A metallic component and a halogen component with refractory organic oxide, the catalyst having been deactivated by deposition of carbonaceous materials thereon during a previous contacting with a hydrocarbon charge stock at an elevated temperature, said method comprising the steps of:

(1) contacting the deactivated catalyst with a gaseous mixture consisting essentially of about 0.2 to about 3 mole percent $O_2$, about 0.02 to about 25 mole percent $H_2O$, about 0.0005 to about 5 mole percent of a halogen or a halogen-containing compound and an inert gas at a temperature of about 350 to about 500° C. for a first period sufficient to substantially remove said carbonaceous materials;

(2) subjecting the catalyst resulting from step (1) to contact with a gaseous mixture consisting essentially of about 0.2 to about 25 mole percent $O_2$, about 0.02 to about 25 mole percent $H_2O$, about 0.0005 to about 5 mole percent of a halogen or a halogen-containing compound and an inert gas for a second period of at least about 1 to 5 hours at a temperature of about 400 to about 550° C.;

(3) purging oxygen and water from contact with the catalyst from step (2) with an inert gas stream; and, (4) subjecting the catalyst resulting from step (3) to contact with a substantially sulfur-free hydrogen stream at a temperature of about 370 to about 600° C. for a final period of at least about 0.5 to about 5 hours, thereby producing a regenerated hydrocarbon conversion catalyst.

2. A method as defined in claim 1 wherein said platinum group component of said catalyst is platinum or a compound of platinum.

3. A method as defined in claim 1 wherein said platinum group component of said catalyst is palladium or a compound of palladium.

4. A method as defined in claim 1 wherein said halogen component of said catalyst is chlorine or a compound of chlorine.

5. A method as defined in claim 1 wherein said halogen component of said catalyst is fluorine or a compound of fluorine.

6. A method as defined in claim 1 wherein the Group IV-A metallic component of said catalyst is germanium or a compound of germanium.

7. A method as defined in claim 1 wherein the Group IV-A metallic component of said catalyst is tin or a compound of tin.

8. A method as defined in claim 1 wherein the Group IV-A metallic component of the catalyst is lead or a compound of lead.

9. A method as defined in claim 1 wherein said refractory inorganic oxide is alumina.

10. A method as defined in claim 9 wherein said alumina carrier material is gamma- or eta-alumina.

11. A method as defined in claim 1 wherein the deactivated catalyst contains, on a carbonaceous material-free and elemental basis, about 0.1 to about 3.5 wt. percent halogen, about 0.01 to about 2 wt. percent platinum group metal and about 0.01 to about 5 wt. percent Group IV-A metal.

12. A method as defined in claim 1 wherein the deactivated catalyst comprises a combination of a platinum component, a chlorine component and a tin component with an alumina carrier material in amounts sufficient to result in a catalyst containing, on a carbonaceous material-free and elemental basis, about 0.1 to about 3.5 wt. percent chlorine, about 0.01 to about 2 wt. percent platinum and about 0.05 to about 2 wt. percent tin.

13. A method as defined in claim 1 wherein the deactivated catalyst contains, on a carbonaceous material-free basis, about 0.01 to about 0.5 wt. percent of sulfur component.

14. A method as defined in claim 1 wherein said deactivated catalyst comprises a combination of a platinum component, a chlorine component and a germanium component with an alumina carrier material in amounts sufficient to result in a catalyst containing, on a carbonaceous material-free and elemental basis, about 0.1 to about 3.5 wt. percent chlorine, about 0.01 to about 2 wt. percent platinum and about 0.01 to about 5 wt. percent germanium.

15. A method as defined in claim 1 wherein the halogen component of the deactivated catalyst is chlorine or a compound of chlorine and the halogen-containing compound contained in the gaseous mixtures used in steps (1) and (2) is hydrogen chloride.

16. A method as defined in claim 1 wherein the gaseous mixture used in step (1) consists essentially of about 0.5 to about 2 mole percent $O_2$, about 0.1 to about 5 mole percent $H_2O$, about 0.001 to 0.25 mole percent of a halogen or a halogen-containing compound and an inert gas.

17. A method as defined in claim 1 wherein the gaseous mixture used in step (2) consists essentially of about 4 to about 25 mole percent $O_2$, about 0.1 to about 5 mole percent $H_2O$, about 0.001 to about 0.25 mole percent of a halogen or a halogen-containing compound and an inert gas.

18. A method as defined in claim 1 wherein step (1) is performed at a temperature of about 375 to about 500° C. and step (2) is performed at a temperature of about 500 to about 550° C.

19. A method as defined in claim 1 wherein step (4) is performed at a temperature of about 450 to about 600° C.

20. A method for regenerating a deactivated hydrocarbon conversion catalyst comprising a combination of a platinum group component, a group IV–A metallic component, and a halogen component with a refractory inorganic oxide, the catalyst having been deactivated by deposition of carbonaceous materials thereon during a previous contacting with a hydrocarbon charge stock at an elevated temperature, said method comprising a combination of the method defined in claim 1 with the step of sulfiding the catalyst resulting from step (4) by contacting same at a temperature of about 20 to 550° C. with a sulfide-producing compound in an amount sufficient to result in a regenerated catalyst containing about 0.01 to about 0.5 wt. percent sulfur.

21. A method as defined in claim 20 wherein said sulfide-producing compound is $H_2S$.

22. A method for regenerating a deactivated hydrocarbon conversion catalyst comprising a combination of a platinum component, a group IV–A metallic component and a chlorine component with an alumina carrier material, the catalyst having been deactivated by deposition of carbonaceous materials thereon during a previous contacting with a hydrocarbon charge stock at an elevated temperature, said method comprising the steps of:
(1) contacting the deactivated catalyst with a gaseous mixture consisting essentially of about 0.2 to about 3 mole percent $O_2$, about 0.02 to about 25 mole percent $H_2O$, about 0.0005 to about 5 mole percent of chlorine or a chlorine-containing compound and an inert gas at a temperature of about 350 to about 500° C. for a first period sufficient to substantially remove said carbonaceous materials;
(2) subjecting the catalyst resulting from step (1) to contact with a gaseous mixture consisting essentially of about 0.2 to about 3 mole percent $O_2$, about 0.02 to about 25 mole percent $H_2O$, about 0.0005 to about 5 mole percent of chlorine or a chlorine-containing compound and an inert gas for a second period of at least about 0.5 to 5 hours at a temperature of about 500 to about 550° C.;
(3) contacting the catalyst resulting from step (2) with a gaseous mixture consisting essentially of about 0.2 to about 25 mole percent $O_2$, about 0.02 to about 25 mole percent $H_2O$, about 0.0005 to about 5 mole percent of chlorine or a chlorine-containing compound and an inert gas for a third period of at least about 1 to 5 hours at a temperature of about 500 to about 550° C.;
(4) purging oxygen and water from contact with the catalyst from step (3) with an inert gas stream; and,
(5) subjecting the catalyst resulting from step (4) to contact with a substantially sulfur-free hydrogen stream at a temperature of about 370 to about 600° C. for a final period of at least about 0.5 to about 5 hours, thereby producing a regenerated hydrocarbon catalyst.

23. A method as defined in claim 22 wherein the chlorine-containing compound in the gaseous mixtures used in steps (1), (2) and (3) is hydrogen chloride.

24. A method as defined in claim 23 wherein the ratio of $H_2O$ to HCl contained in the gaseous mixtures used in steps (1), (2) and (3) is selected from the range of about 20:1 to about 100:1.

25. A method as defined in claim 22 wherein said gaseous mixture used in step (3) contains about 4 to about 25 mole percent oxygen, about 0.1 to about 5 mole percent $H_2O$ and about 0.001 to about 0.25 mole percent of chlorine or a chlorine-containing compound.

26. A method as defined in claim 22 wherein the chlorine component of the catalyst is maintained, throughout the regeneration, at about 0.5 to about 1.5 wt. percent of the catalyst, calculated on a carbonaceous material-free and elemental basis.

27. A method as defined in claim 22 wherein the gaseous mixtures used in steps (1) and (2) contain about 0.5 to about 2 mole percent $O_2$, about 0.1 to about 5 mole percent $H_2O$ and about 0.001 to about 0.25 mole percent chlorine or a chlorine-containing compound.

28. A method as defined in claim 22 wherein the catalyst resulting from step (3) is thereafter treated with a gaseous mixture comprising about 1 to about 30 mole percent $H_2O$, about 0.001 to about 1.5 mole percent of chlorine or a chlorine-containing compound and air for a fourth period of at least about 3 to 5 hours at a temperature of about 500 to 550° C. and thereafter steps (4) and (5) are performed on the resulting treated catalyst.

29. A method for regenerating a deactivated hydrocarbon conversion catalyst comprising a combination of a platinum component, a group IV–A metallic component and a chlorine component with an alumina carrier material, the catalyst having been deactivated by deposition of carbonaceous materials thereon during a previous contacting with a hydrocarbon charge stock at an elevated temperature, said method comprising a combination of the method defined in claim 22 with the step of sulfiding the catalyst from step (5) by contacting same at a temperature of about 20 to 550° C. with a sulfide-producing compound in an amount sufficient to result in a regenerated catalyst containing about 0.01 to about 0.5 wt. percent sulfur.

30. A method as defined in claim 29 wherein said sulfide-producing compound is $H_2S$.

References Cited

UNITED STATES PATENTS

| | | | |
|---|---|---|---|
| 3,558,479 | 1/1971 | Jacobson et al. | 208—139 |
| 2,916,440 | 12/1959 | Hogin et al. | 208—140 |
| 2,981,694 | 4/1961 | Engel | 252—415 |
| 3,617,520 | 11/1971 | Kluksdahl | 252—466 PT |
| 3,481,861 | 12/1969 | Hayes | 208—140 |
| 3,576,766 | 4/1971 | Rausch | 252—466 PT |
| 3,567,656 | 3/1971 | Mitsche | 252—466 PT |
| 3,607,728 | 9/1971 | Wilhelm | 252—466 PT |
| 3,531,543 | 9/1970 | Clippinger et al. | 252—466 PT |
| 3,511,888 | 5/1970 | Jenkins | 208—138 |
| 3,533,960 | 10/1970 | Weinert | 252—419 |

FOREIGN PATENTS

| | | | |
|---|---|---|---|
| 1,044,045 | 11/1958 | Germany | 252—415 |

DANIEL E. WYMAN, Primary Examiner

P. E. KONOPKA, Assistant Examiner

U.S. Cl. X.R.

208—140; 252—419